United States Patent
Piirma

[15] 3,676,393
[45] July 11, 1972

[54] POLYESTERS STABILIZED BY PHOSPHORUS COMPOUNDS

[72] Inventor: Aleksander Piirma, Stow, Ohio

[73] Assignee: The Goodyear Tire & Rubber Company, Akron, Ohio

[22] Filed: Oct. 14, 1968

[21] Appl. No.: 768,966

Related U.S. Application Data

[63] Continuation of Ser. No. 650,219, June 30, 1967, abandoned, which is a continuation-in-part of Ser. No. 348,786, March 2, 1964, abandoned.

[52] U.S. Cl. ............260/45.7 P, 260/45.7 PS, 260/45.75 R, 260/45.8 R
[51] Int. Cl. ..........................................C08q 51/58
[58] Field of Search ....................260/45.7 P, 45.8, 75 P

[56] References Cited

UNITED STATES PATENTS

| | | | |
|---|---|---|---|
| 2,877,204 | 3/1959 | Duhnkrack et al. | 260/45.7 X |
| 3,310,575 | 3/1967 | Spivack | 260/429 |
| 3,406,153 | 10/1968 | Eaton et al. | 260/75 |

OTHER PUBLICATIONS

Gefter, Organophosphorus Monomers & Polymers, Assoc. Tech. Services, Glen Ridge, N.J. 1962, pp X– XIII
Kosolapoff, Organophorus Compounds, John Wiley & Son, N.Y., 1950, pp. 4 & 5.

*Primary Examiner*—Donald E. Czaja
*Assistant Examiner*—M. J. Welsh
*Attorney*—F. W. Brunner and James M. Wallace, Jr.

[57] ABSTRACT

The invention concerns stabilization of polyester resins by incorporating in the resins certain types of phosphorous compounds. The application particularly relates to the process of stabilizing and to the stabilized compositions.

3 Claims, No Drawings

POLYESTERS STABILIZED BY PHOSPHORUS COMPOUNDS

This application is a continuation of application Ser. No. 650,219, filed June 30, 1967, now abandoned, which was a continuation-in-part of application Ser. No. 348,786, filed Mar. 2, 1964, now abandoned.

This invention relates to an improvement in condensation polyester resins, to a method for preparing condensation polyesters having improved stability and to the compositions prepared.

Highly polymeric polyester resins are derived from glycols and dicarboxylic acids or ester-forming derivatives thereof by condensation reactions. In carrying out such reactions the reactants are subjected to stringent conditions of elevated temperature and reduced pressure for considerable periods of time. The polymeric polyesters thus prepared develop a light yellow or brown color which is highly undesirable because such color is carried over into products made from the polyesters. Development of any yellow or brown color is especially undesirable in fibers and films, which constitute a major use for condensation polyester resins. In addition to the development of color, condensation polyesters degrade on exposure to heat and to conditions that favor hydrolysis of ester compounds.

It is an object of the present invention to produce polyester resins of improved stability. Another object is to produce polyester resins having a very low degree of color. Another object is to provide a method for producing polyester resins having a low degree of color and which have good thermal and hydrolytic stability. Other objects will appear as the description of the invention proceeds.

According to the invention highly polymeric condensation polyester resins having superior stability are produced by incorporating in such resins a compound of phosphorus selected from the group consisting of compounds having the formula (A) 

in which R is selected from the group consisting of alkyl, cycloalkyl, aryl, alkaryl and aralkyl radicals, R' and R'' are the same or different radicals selected from the group consisting of hydrogen, SH, ONa, alkyl, cycloalkyl, aryl, alkaryl, aralkyl, —S—alkyl, —S—aryl, —S—aralkyl, —S—alkaryl, —S—cycloalkyl, hydroxy, alkoxy, cycloalkoxy, aryloxy, alkaryloxy and aralkoxy radicals, and R' and R'' can together with the phosphorus atom form a single chain or ring which can contain —CH$_2$— and —O—; and (B) 

in which R, R' and R'' have the same meaning as in (A) above and X is selected from the group consisting of oxygen, sulfur and selenium. In the above there can be for example alkyl radicals such as methyl, ethyl, propyl, butyl, amyl, hexyl, octyl, decyl; cycloalkyl radicals such as cyclopentyl, cyclohexyl; aryl radicals such as phenyl, tolyl, naphthyl, biphenyl; alkaryl radicals such as benzyl, phenpropyl, phenbutyl; alkoxy radicals such as methoxy, ethoxy, butoxy, etc.; cycloalkoxy radicals such as cyclopentyloxy, cyclohexyloxy; aryloxy radicals such as phenoxy, phenylphenoxy, naphthoxy; alkaryloxy radicals such as tolyloxy, ethylphenoxy; and aralkoxy radicals such as benzyloxy, phenethoxy and phenpropoxy.

The following examples illustrate the practice of the invention.

The results of a series of tests on various compounds having the general formula

are recorded in Table I. In each case the test was carried out in the following manner. Fifty grams of a 90/10 ethylene terephthalate-ethylene isophthalate copolyester resin having an intrinsic viscosity of 0.618 which had been prepared from dimethyl terephthalate, dimethyl isophthalate and ethylene glycol by ester interchange and condensation reactions using 0.025 percent of zinc acetate and 0.0027 percent of polymeric ethylene glycol titanate as catalysts were charged into a small glass tube and heated at 280° C. Nitrogen gas was slowly passed into the tube. After 10 minutes at this temperature the resin was in the form of a viscous melt. The melt was stirred and the compound being tested for stabilizing action was added, after which the mixture was stirred and heated for 10 minutes at atmospheric pressure. Then the pressure in the reaction tube was reduced to 1 millimeter of mercury pressure and the mixture was heated for 20 minutes at 280° C. at this pressure. Heating was stopped, the pressure in the tube was brought to atmospheric pressure and the resin was removed from the tube.

The percent of broken bonds on exposure to heat or thermal stability of each of the resins in the table was determined as follows:

About 10 grams of thoroughly dried polymer were heated in nitrogen atmosphere for 2 hours in a test tube inserted in an aluminum block maintained at 280° C. The intrinsic viscosity of the original polyester resin and of each of the thus treated samples of polyester resin was determined in a 60/40 phenol-tetrachloroethane mixed solvent at 30.0° C. The per cent of broken linkages was calculated for each sample of resin using the following formula:

$$\text{Percent of broken linkages} = \frac{IV_{in} - IV_{degraded}}{IV_{in} \times IV_{degraded}} \times C \times 100$$

in which $IV_{in}$ = intrinsic viscosity of the polymer before thermal degradation, $IV_{degraded}$ = intrinsic viscosity after thermal treatment, $C$ = a factor which depends on the viscosity range of the sample.

The following average values of $C$ were used in these calculations:

| IV Range | Conversion Factor C |
|---|---|
| 0.75–0.65 | 0.396 |
| 0.70–0.60 | 0.401 |
| 0.65–0.55 | 0.409 |
| 0.60–0.50 | 0.417 |
| 0.55–0.45 | 0.422 |
| 0.50–0.40 | 0.435 |

The percent of broken bonds on exposure to steam (or hydrolytic stability) of each of the resins was determined as follows:

A portion of the polymer sample was cut into particles having a diameter of about 2 millimeters. About 1 gram of these particles was heated at 140° C. under 1 millimeter of mercury pressure for 16 hours.

The polymer was then transferred to a 400 milliliter stainless steel beaker containing 20 milliliters of distilled water. The beaker was placed in a steam sterilizer and heated at 120° C. for 6 hours. The polymer was recovered from the water by filtration, rinsed with acetone, and dried for 3 hours at 60° C. at atmospheric pressure and then for 16 hours at 140° C. and 1 millimeter vacuum. The intrinsic viscosity of the thus treated polymer was determined in a 60/40 phenol-tetrachloroethane mixed solvent at 30.0° C. The percent of broken linkages due to the hydrolysis treatment was calculated for each sample of resin using the following formula:

$$\text{Percent of broken linkages} = \frac{IV_{in} - IV_{hydro}}{IV_{in} \times IV_{hydro}} \times C \times 100$$

in which $IV_{in}$ is the intrinsic viscosity of the original polymer and $IV_{hydro}$ is the intrinsic viscosity of the hydrolyzed polymer.

TABLE I

| No. | Compound Added | Intrinsic Viscosity of Polymer % by wt. Init-added ial | Initial | Degraded | Hydrolyzed | % Broken Linkages Heat Degraded | Hydrolyzed |
|---|---|---|---|---|---|---|---|
| 1 | phenylphosphonous acid | 0.20 | 0.515 | 0.466 | 0.449 | 0.089 | 0.140 |
| 2 | Phenylphosphonous acid | 0.03 | 0.592 | 0.538 | 0.513 | 0.071 | 0.108 |
| 3 | Phenylphosphonic acid | 0.04 | 0.692 | 0.619 | 0.596 | 0.064 | 0.094 |
| 4 | Phenylphosphonic acid | 0.08 | 0.672 | 0.603 | 0.574 | 0.069 | 0.104 |
| 5 | Butyl phenyl butane-phosphonate | 0.04 | 0.709 | 0.625 | 0.607 | 0.075 | 0.093 |
| 6 | Dibutyl cyclohexylphosphonate | 0.04 | 0.741 | 0.638 | 0.618 | 0.069 | 0.107 |
| 7 | Hydroxymethylphosphonic acid | 0.02 | 0.748 | 0.602 | 0.598 | 0.128 | 0.134 |
| 8 | Bis-(hydroxymethyl)phosphonic acid | 0.02 | 0.740 | 0.576 | 0.600 | 0.152 | 0.126 |
| 9 | No stabilizer | — | 0.689 | 0.561 | 0.551 | 0.132 | 0.146 |

The effect of exposure to heat on color of the resin in the heat treatment or thermal stability test is shown in the following table.

TABLE II

| No. | Initial | Heat Treated |
|---|---|---|
| 1 | Almost colorless | Almost colorless—less color than original polymer |
| 2 | Grey | Grey |
| 3 | Paler than control | Much paler than control |
| 4 | Paler than control | Much paler than control |
| 5 | Paler than control | Much paler than control |
| 6 | Paler than control | Much paler than control |
| 7 | Same as control | Same as control |
| 8 | Darker than control | Darker than control |

The above examples show the addition of the stabilizing agent to polyester resin after the resin has been prepared. The stabilizing agents of the invention can also be incorporated in the resin during formation of the resin by adding them to polyester-forming reactants and reacting them to form high molecular weight polyester. The results of a series of tests in which the stabilizer was added to the reactants and the reactants reacted to form high molecular weight polymer are recorded in Table III. The tests were carried out as follows:

A glass reaction tube approximately 35 centimeters long having an inside diameter of 38 millimeters, having a side arm and equipped with a nitrogen gas inlet tube and a stirrer was charged with 50 grams of dimethyl terephthalate, 40 milliliters of ethylene glycol and the catalyst and stabilizer being tested as indicated in the table. The mixture was stirred and oxygen-free nitrogen gas was slowly passed through the mixture. The reaction tube was heated by means of a diethylene glycol vapor bath until approximately the theoretical amount of methanol distilled from the reaction mixture. The pressure in the system was then slowly reduced over a period of 30 minutes to 1 millimeter of mercury pressure. The resulting low molecular weight polymer prepared had an intrinsic viscosity of about 0.3. The diethylene glycol vapor bath was replaced by a dimethyl phthalate vapor bath which boils at 282° C. The mixture was heated and reacted with stirring for about 2 hours at 282° C. and 1 millimeter of mercury pressure. The data on these runs are tabulated in Table III, which shows the percent of broken bonds as well as catalysts and stabilizers which were used.

TABLE III

| Sample No. | Catalysts and Stabilizer | % Broken Linkages Heat Degraded | Hydrolyzed | M.P. °C. |
|---|---|---|---|---|
| 9 | Manganese acetate (anhy.) Dibutyl butylphosphonate | 0.06 | 0.11 | 262 |
| 10 | Zinc acetate·2H$_2$O Antimony trioxide Diphenyl phenylphosphonate | 0.084 | 0.10 | 263 |
| 11 | Zinc acetate·2H$_2$O Ethylene glycol titanate Ethylene phenylphosphonate | 0.07 | 0.08 | 261 |
| 12 | Manganese acetate·4H$_2$O Antimony trioxide Diphenoxyphosphine oxide | 0.05 | 0.05 | 262 |
| 13 | Manganese acetate (anhy) Antimony trioxide 2-oxo-1,3,2 dioxaphospholane | 0.06 | 0.05 | 262 |

Runs on a somewhat larger scale were made to test the effect of certain other stabilizers of the invention on the stability of polyethylene terephthalate. In these runs 5.07 pounds of dimethyl terephthalate, 3.51 pounds of ethylene glycol and the catalysts were charged into a 12-liter glass flask and subjected to ester interchange reaction conditions for a period of from 2 to 3 hours. The methanol released was distilled out of the reaction mixture and the temperature of the mixture was slowly raised to 230° C. This product was transferred to a stainless steel reactor which was equipped with an agitator and a condenser. The pressure in the reactor was slowly reduced to 1 millimeter of mercury pressure and the reactor was gradually heated until at the end of about 100 minutes the temperature of the mixture reached 272° C. The mixture was reacted under these conditions for 6 hours. A high molecular weight polymeric ethylene terephthalate was formed. The results on these runs are tabulated in Table IV below. The table indicates the amounts of catalysts and stabilizers added and the times when they were added and the results obtained in stability tests on samples of the polymer.

TABLE IV

Stabilization of Polyethylene Terephthalate with Phosphonates

| Sample no. | Catalysts and stabilizers | % by wt. based on Dimethyl Terephthalate | Time of Addition | IV |
|---|---|---|---|---|
| 14 | Manganese acetate(anhy) Antimony trioxide | 0.027 0.050 | With reactants With reactants | 0.797 |
| 15 | Manganese acetate(anhy) Antimony trioxide Diphenyl phenylphosphonate | 0.027 0.025 0.280 | With reactants With reactants End of ester interchange reaction | 0.822 |
| 16 | Manganese acetate(anhy) Antimony trioxide Diphenyl phenylphosphonate | 0.027 0.025 0.078 | With charge End of ester interchange reaction End of ester interchange reaction | 0.903 |

The results obtained in heat stability tests and hydrolytic tests on the above polymers are tabulated in Table V below.

TABLE V

| Sample No. | Color | % Broken Linkages Heat Degraded | Hydrolyzed |
|---|---|---|---|
| 14 | Pale grey | 0.112 | 0.129 |
| 15 | White | 0.044 | 0.52 |
| 16 | Pale green | 0.065 | 0.122 |

The stabilizers can be added to the polyester-forming reactants, to the finished polyester resin or to the resin in an intermediate stage of its preparation. Thus, the stabilizers can be added to the mixture of bis esters of the acids and glycol before the ester interchange reaction is started or at some point during the reaction. They may also be added to the bis glycol esters or low polymers thereof which can then be condensed to form high molecular weight polymer. It is preferred to add the stabilizers to the polyester-forming reactants because generally polyesters having a very low degree of color are formed when the stabilizer is added to the reactants before they are polymerized.

The amount of the stabilizer used can be varied over a wide range. Generally the amount used will be from 0.01 to 0.5 percent by weight of the polyester resin. The preferred amounts used will be in the range of from 0.02 to 0.3 percent by weight of the polyester resin to obtain optimum stability in the resin.

There is some confusion in the literature regarding the actual nomenclature of phosphorus compounds. In order to avoid any misunderstanding concerning the structure of compounds specifically named in this specification the compounds are named as derivatives of phosphine, phosphine oxide and phosphonic acid as set out below. Compounds of the type:

are named as derivatives of phosphine:

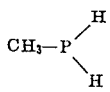

is methyl phosphine

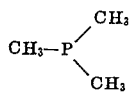

is trimethyl phosphine.

Compounds of the type:

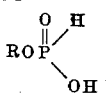

are named as derivatives of phosphine oxide. Thus,

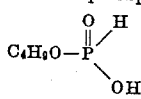

is butoxyhydroxy phosphine oxide.

The corresponding dibutyl compound,

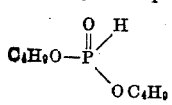

is dibutoxy phosphine oxide.

Compounds of the type:

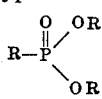

are named as esters of phosphonic acid. For example,

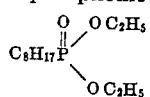

is diethyl octylphosphonate.

Representative examples of the compounds of the invention are phosphinous, phosphonous and phosphonic acids, their sulfur and selenium analogs, and salts and esters such as:

1. Phosphines, phosphonous acids and derivatives
    Phenyl phosphonous acid
    Diphenyl phenylphosphonite
    Methylphosphine
    Vinylphosphine
    Cyclohexylphosphine
    Phenylphosphine
    Methylbenzylphosphine
    Ditolylphosphine
    Propoxyphosphine
    Heptoxyethylphosphine
    Cyclohexoxycyclohexyl phosphine
    Benzoxybenzylphosphine
    Dicyclopentoxyphosphine
    Diethoxyphosphine
    Tributylphosphine
    Triphenylphosphine
    Dibutyl butylphosphonite
    Methyl diphenylphosphinite
    Benzyl diethylphosphinite
    Dibutylthiophosphinic acid
    2-methyl-1,3,2-oxaphospholane
2. Phosphinous acids and derivatives
    Phenyl diphenylphosphinite
    Dinonylphosphine oxide
    Propyloctylphosphine oxide
    Divinylphosphine oxide
    Di(cyclopropyl)phosphine oxide
    Di-(dimethyl cyclopropyl)phosphine oxide
    Dicyclohexenylphosphine oxide
    Diphenylphosphine oxide
    Dibenzylphosphine oxide
    Ditolylphosphine oxide
    Naphthylmethylphosphine oxide
    Ethylhydroxyphosphine oxide
    Cyclobutylhydroxyphosphine oxide
    Cyclobutoxyphosphine oxide
    Cyclobutenoxyphosphine oxide
    Phenoxyphosphine oxide
    Benzyloxyphosphine oxide
3. Primary phosphonic acids and derivatives
    Phenylphosphonic acid
    Diphenyl phenylphosphonate
    Dibutyl butylphosphonate
    Butylphenyl butylphosphonate
    Dibutyl cyclohexylphosphonate
    Ethylene phenylphosphonate
    n-decylphosphine oxide
    Cyclobutylphosphine oxide
    Cyclohexylethylphosphine oxide
    Phenylphosphine oxide
    Methylnaphthylphosphine oxide
    Benzylphosphine oxide
    Tributylphosphine oxide
    Tri(isobutynyl)phosphine oxide
    Tricyclohexylphosphine oxide
    Triphenylphosphine oxide
    Tri(3-nitrophenyl)phosphine oxide
    Tri-(4-dimethylaminophenyl)phosphine oxide
    Tri-(4-chlorophenyl)phosphine oxide
    Tri-(2-methylphenyl)phosphine oxide
    Tri-(4-carboxylphenyl)phosphine oxide
    Tri-(3-hydroxyphenyl)phosphine oxide
    Tri-(4-methoxyphenyl)phosphine oxide
    Tribenzylphosphine oxide
    Tri-3-indolylphosphine oxide
    Dimethylethylphosphine oxide
    Dimethylphenylphosphine oxide
    Dimethyltolylphosphine oxide
    Diphenylethylphosphine oxide
    Di-(4-carboxyphenyl)methylphosphine oxide
    Diphenyl(3-carboxyphenyl)phosphine oxide
    Ditolylphenylphosphine oxide
    Methylethylphenylphosphine oxide
    Methylphenylbenzylphosphine oxide Methyl cyclohexyltolyl phosphine oxide
2-chloroethylfurylpyridylphosphine oxide
Allylhydroxyphosphine oxide
Benzylhydroxyphosphine oxide
Phenylhydroxyphosphine oxide
p-chlorophenylhydroxyphosphine oxide
4,4'-biphenyldi-(hydroxyphosphine oxide)
Butylbutoxyphosphine oxide
Cyclohexylcyclohexoxyphosphine oxide
Phenylphenoxyphosphine oxide
Benzylcyclopropoxyphosphine oxide
p-tolylcyclohexoxyphosphine oxide
Monocyclopentoxyhydroxyphosphine oxide
Methylphenoxyhydroxyphosphine oxide
Benzyloxyhydroxyphosphine oxide
Diisooctoxyphosphine oxide
Di-(2-phenylethoxy)phosphine oxide
Diphenoxyphosphine oxide
Di-(4-methylphenoxy)phosphine oxide
2-oxo-1,3,2-dioxaphospholane
Methylphosphonic acid
Allylphosphonic acid
4 methoxyphenylphosphonic acid
3-chlorophenylphosphonic acid
2-methylphenylphosphonic acid
Cyclohexylphosphonic acid
Benzylphosphonic acid
Cyclohexenylphosphonic acid
4-hydroxyphenylphosphonic acid
4-cyanophenylphosphonic acid
Diethyl octylphosphonate
Ethylhexylmethylphosphonate
2-oxo-2-ethyl-1,3,2-dioxaphospholane
Diphenyl cyclohexylphosphonate
Tetraethyl 1,3 propene diphosphonate
2-ethoxy-2-oxo-1,2-oxaphospholane
Dipropyl allylphosphonate
Dibenzyl cyclohexenylphosphonate
Phenyl ethyl phenylphosphonate
Benzyl methyl 4-hydroxyphenylphosphonate
Monophenyl cyclohexylphosphonate
Monobutyl phenylphosphonate
0,0-bis-(trimethylsilyl) cyclohexylphosphonate
4. Secondary phosphonic acids and derivatives
Diphenylphosphonic acid
Phenyl diphenylphosphonate
Methyl dimethylphosphonate
Ethyl methylphenylphosphonate
Benzyl allylphenylphosphonate
Cyclohexyl cyclohexylnaphthylphosphonate
2-oxo-2-methyl 1,3,2-oxaphospholane
Dipropylphosphonic acid
Methylphenylphosphonic acid
Cyclohexyl-4-methylphenylphosphonic acid
1,6-bis-[cyclohexylphosphonyl] hexane
Bis-[1-hydroxy-1-carboxyethyl]phosphonic acid
Dibenzylphosphonic acid
2-chloroethyl-4-chlorophenylphosphonic acid
5. Primary phosphine sulfides and derivatives
Phenylphosphine sulfide
Disodium ethylthiophosphonate
0,0-dimethyl methylthiophosphonate
0-methyl, 0-4-chlorophenyl phenylthiophosphonate
Ethyl methyldithiophosphonate
6. Dithio phosphonous acids and derivatives
Dibutyl dithiophenylphosphonite
Trimethylphosphine sulfide
Triphenylphosphine sulfide
Tribenzylphosphine sulfide
Tri-p-tolylphosphine sulfide
Tri-2-pyridylphosphine sulfide
Tri(cyclohexyl)phosphine sulfide
Tri-(4-carboxyphenyl) phosphine sulfide
Dimethyl(4-dimethylaminophenyl) phosphine sulfide
Diethylphenylphosphine sulfide
Diethylbenzylphosphine sulfide
Diphenylallylphosphine sulfide
Diphenylbenzylphosphine sulfide
Di-(p-tolyl)(4-chlorophenyl) phosphine sulfide
Ethylphenyl(4-hydroxyphenyl) phosphine sulfide
Methylbenzyl(4-carboxyphenyl) phosphine oxide
7. Secondary thiophosphinous acids and derivatives
Butyl thiodiphenylphosphonite
8. Thiophosphonic acids and derivatives
Diphenyl -thiophenylphosphonate
Sodium diethylthiophosphonate
Diphenylthiophosphonic acid
Dibenzylthiophosphonic acid
9. Dithiophosphonic acids and derivatives
Disodium dithiophenylphosphonate
Sodium dibutyldithiophosphonate
1,4-bis[phenyldithiophosphonyl] butane
S-cyclohexyl dimethylthiophosphonate
S-4-chlorophenyl methylethylthiophosphonate
S-hexyl diphenylthiophosphonate
S-benzyl dimethylthiophosphonate
S-methyl diphenylthiophosphonate
Cyclohexyl diethyldithiophosphonate
2-hydroxypropyl diphenyldithiophosphonate
10. Trithiophosphonic acids and derivatives
Dibutyl trithiophenylphosphonate
Diethyl ethyltrithiophosphonate
11. Secondary thiophosphonic acids and derivatives
(0)-phenyl thiodiphenylphosphonate
12. Secondary dithiophosphonic acids and derivatives
Dithiodiphenylphosphonic acid
13. Tertiary phosphine selenides
Trimethylphosphine selenide
Triphenylphosphine selenide
Tribenzylphosphine selenide
Tri-(4-methylphenyl) phosphine selenide
Di-(4-methylphenyl)-4-chlorophenyl phosphine selenide
Phenyl(4-bromophenyl)(4-dimethylaminophenyl)phosphine selenide Preferred compounds of stabilizers are:
Diphenyl phenylphosphonate
Dibutyl butylphosphonate
Diphenyl phenylphosphonite
Diphenoxyphosphine oxide The invention has been illustrated particularly with respect to stabilizing ethylene terephthalate and ethylene terephthalate-ethylene isophthalate copolyester resin. It can also be used to stabilize other condensation polyester resins. Representative examples of such condensation polyester resins are resins derived from dicarboxylic acids or ester-forming derivatives thereof and glycols such as polyethylene terephthalate, polytetramethylene terephthalate, polycyclohexane dimethanol terephthalate, polyethylene bibenzoate, copolyesters of terephthalic acid, an aliphatic dicarboxylic acid and a glycol, etc. Dicarboxylic acids from which the resins can be derived are aliphatic dicarboxylic acids such as adipic acid, sebacic acid and azelaic acid; aromatic dicarboxylic acids such as orthophthalic acid, isophthalic acid, terephthalic acid, 2,5-dichloroterephthalic acid, bibenzoic acid and the naphthalic acids. The resins can be made from various glycols, including glycols such as the propylene glycols, the butylene glycols, pentamethylene glycol, hexamethylene glycol, decamethylene glycol, diethylene glycol, 1,4-cyclohexane dimethanol and 2,2-bis [4($\beta$-hydroxyethoxy)phenyl] propane. Ethylene glycol is a preferred glycol because of its low cost and ready availability.

The polyester resins are prepared in accordance with known techniques. Thus the resins can be prepared by reacting bis esters of the acids with glycols under ester interchange conditions to form the glycol esters or low polymers thereof. These products are then polymerized under condensation polymerization conditions to form high molecular weight polymer. If desired, the glycol esters can be prepared by some other suitable method and then polymerized to form high molecular weight polymer. The reactions are preferably carried out in an atmosphere of inert gas such as nitrogen or the like, in order to lessen darkening and to facilitate the preparation of high molecular weight color or colorless products. The condensation reaction is carried out under reduced pressure, generally below 10 millimeters of mercury pressure, and usually at or below 1 millimeter of mercury pressure at a temperature in the range of from about 260° to 290° C. The reactants are condensed to high molecular weight polyesters having an intrinsic viscosity of at least 0.3 measured in a 60/40 phenol-tetrachloroethane mixed solvent.

In the preparation of the polyester resins various catalysts can be used. Catalysts such as soluble compounds of zinc, manganese, magnesium, calcium, sodium and potassium can be used for the ester interchange reaction and catalysts such as litharge, lead dioxide, antimony trioxide and polymeric ethylene glycol titanate can be used in the condensation reaction.

While certain representative embodiments and details have been shown for the purpose of illustrating the invention it will be apparent to those skilled in this art that various changes and modifications may be made therein without departing from the spirit or scope of the invention.

What I claim is:

1. A stabilized composition comprising a highly polymeric condensation polyester resin derived from a glycol and a dicarboxylic acid containing a stabilizing amount of diphenyl phenylphosphonate.

2. A stabilized composition comprising a highly polymeric condensation polyester resin derived from a glycol and a dicarboxylic acid containing a stabilizing amount of dibutyl butylphosphonate.

3. A stabilized composition comprising a highly polymeric condensation polyester resin derived from a glycol and a dicarboxylic acid containing a stabilizing amount of butyl phenyl butylphosphonate.

* * * * *